United States Patent

[11] 3,586,959

| [72] | Inventors | Arnaud Michael Eccles;<br>John James Laurence Weaver, both of Stafford, England |
|---|---|---|
| [21] | Appl. No. | 811,737 |
| [22] | Filed | Apr. 1, 1969 |
| [45] | Patented | June 22, 1971 |
| [73] | Assignee | The English Electric Company Limited<br>London, England |
| [32] | Priority | Apr. 2, 1968, May 15, 1968 |
| [33] | | Great Britain |
| [31] | | 15728/68 and 23116/68 |

[54] HIGH-VOLTAGE THYRISTOR EQUIPMENT
10 Claims, 5 Drawing Figs.

[52] U.S. Cl. .................................................. 321/8,
317/100, 321/11
[51] Int. Cl. .................................................. H02m 7/20,
H02n 7/14, H02b 1/00
[50] Field of Search ......................................... 321/8, 11,
27, 8 C; 307/252 D; 317/234, 100

[56] References Cited
UNITED STATES PATENTS

| 2,946,934 | 7/1960 | Caputo .......................... | 321/8 CUX |
| 2,984,773 | 5/1961 | Guldemond et al. .......... | 321/8 UX |
| 3,355,600 | 11/1967 | Mapham ........................ | 307/252 DUX |
| 3,369,166 | 2/1968 | Lake .............................. | 321/8 |
| 3,422,340 | 1/1969 | Richmond et al. ............ | 321/11 |
| 3,496,445 | 2/1970 | Boksjo et al. ................. | 321/11 X |

FOREIGN PATENTS

| 225,659 | 5/1943 | Switzerland .................. | 321/8 CUX |

*Primary Examiner*—William H. Beha, Jr.
*Attorneys*—Misegades and Douglas. Keith Misegades and George R. Douglas, Jr.

ABSTRACT: A converter for high-voltage DC transmission schemes comprises a stack of thyristors arranged in a helical configuration around a number of tubular ducts upstanding from a coolant reservoir, the coolant being pumped through these ducts.

HIGH-VOLTAGE THYRISTOR EQUIPMENT

This invention relates to high-voltage thyristor equipment, and more particularly relates to the physical disposition of the thyristors and their associated circuit components in such equipment.

From one aspect, the present invention consists in thyristor equipment comprising a hollow annular receptacle for a coolant fluid, a plurality of tubular ducts equidistantly spaced from one another around the receptacle and upstanding therefrom in a cylindrical configuration, and a plurality of thyristors mounted along the length of each duct which is arranged to conduct fluid from the receptacle, the thyristors being so arranged relatively to one another as to define a helical path encircling all the said ducts.

This "stack" of thyristors may be enveloped within a sealed tubular housing, the coolant fluid issuing from the top of the ducts within the housing and thence flowing downwardly into a trough at its base adjacent the annular receptacle, means being provided for continuously pumping the fluid around this circuit via a heat exchanger. Corona shields may be connected to the thyristors and disposed between them and the inner surface of the housing, these shields following the helical path defined by their associated thyristors.

The invention is not limited to the use of only a single helical path, and alternatively the thyristors may be disposed along a number of separate helical paths in the manner of a multistart "thread."

The circuit components associated with the thyristors, which may all be connected in series or series/parallel strings, may principally be located on the outer side of the ducts with the thyristors, but in the interests of better space utilization some components may be secured to the inner side of the ducts in which case additional corona shields may be provided therefor to minimize the risk of flashovers between them.

The thyristors may all be fired in response to light or other radiated signals from a common source, e.g. a laser, and such signals may be transmitted through filamentary light guides (fiber optics) bundles of which extend along the ducts. These bundles may, in turn, emanate from a "mixer" whereby a uniform or coherent distribution of light may be ensured amongst them.

Thyristor equipment according to this invention is particularly well suited for use in converters associated with high voltage DC transmission schemes, the disposition of these components enabling a more satisfactory distribution of capacitance to be achieved throughout the stack and thus avoid the tendency for dangerously high local voltages to be set up which may cause the destruction of a thyristor and possibly set up a progressive failure of these components. Better space utilization and cooling efficiency is also achieved with this layout and ready access can be had to any selected thyristor unit.

In order that the invention may be fully understood, one embodiment thereof will now be described, by way of example, with reference to the accompanying drawings, in which.

Figure 1:
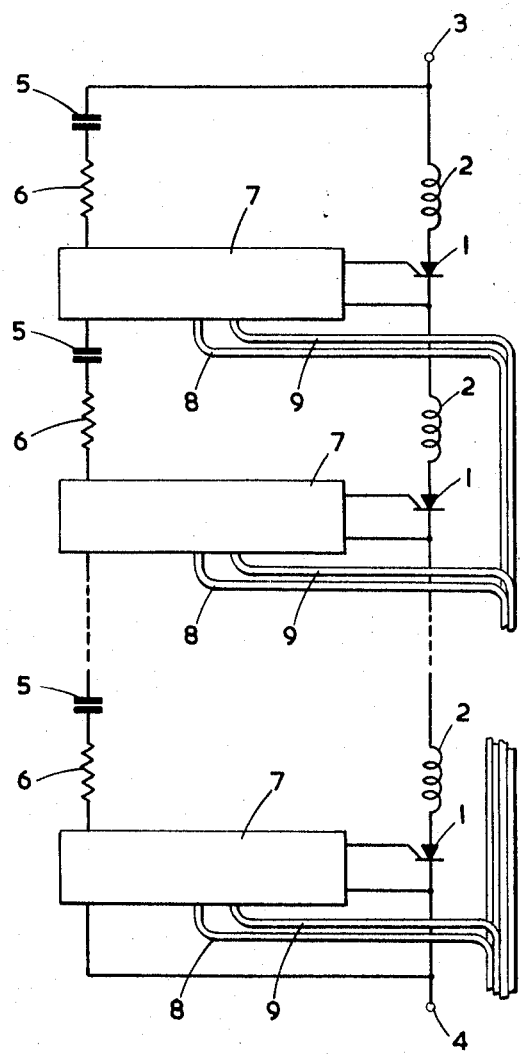
FIG. 1 illustrates a schematic circuit diagram of the principal components of one arm of a converter bridge network utilizing a series string of thyristors to be fired simultaneously with one another.

Referring now to FIG. 1, a number of thyristors 1 and their associated current-limiting reactors 2 are connected in series between supply terminals 3 and 4. Connected across these terminals are voltage sharing circuits each comprising a capacitor 5 and a resistor 6, these circuits being serially connected by a bridge rectifier in each of the gating units 7 which functions to provide the DC supply for these units. The detailed circuitry of these units is of no consequence to the invention in this application except in so far as concerns the means by which all the thyristors are gated on simultaneously with one another. In this respect a bistable circuit is employed utilizing phototransistors sequentially irradiated by light issuing from bundles of filamentary light guides 8, 9 the bistable circuit gating on its associated thyristor when it is in one state and "blocking" the thyristor when it is in its other state. The light directed on to the two phototransistors in each bistable emanates from two separate sources, e.g. lasers, via separate mixers to be described.

Figure 2:
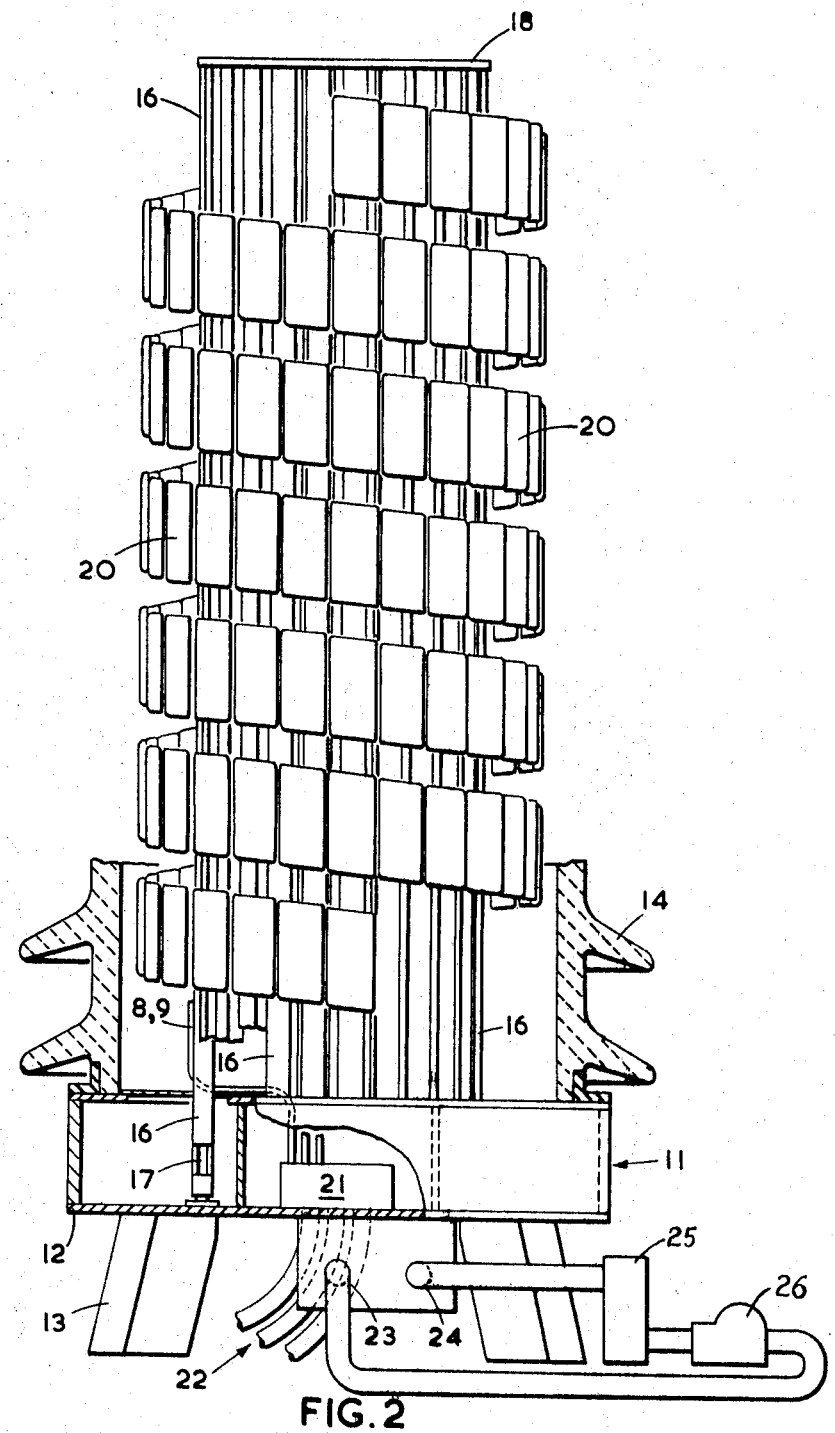
FIG. 2 illustrates the physical layout of these thyristors and their associated components in a stack.

Referring now to FIG. 2, the components in the circuit described are arranged in a stack. In particular, a hollow annular body 11 having a plain baseplate 12 stands on a number of supporting legs 13 and carries a sealed shedded ceramic envelope 14 in which the thyristor stack is disposed. The series-connected thyristors and their associated components are carried on a number of tubular ducts 16 equidistantly spaced from one another and which extend through the upper side of the body 11, each duct being made of an insulating material and having an aperture 17 adjacent its lower end communicating with the chamber defined by this body. These ducts are seated in a support ring 18 at their upper end.

The thyristors have secured to their cathodes separate corona shields 20 which follow the helical path around the ducts defined by their associated thyristors, and the filamentary light guides 8, 9 through which they are gated on alongside the ducts. These guides emanate from two separate mixers 21, only one of which is shown, mounted in a trough within the annular body, the mixers functioning to provide a uniform distribution of light from a number of primary light guides 22 illuminated from a laser source. Each mixer may be of the type in which, for example, three series-connected lasers in each source are coupled to every one of the gating circuits through different filament bundles.

A coolant fluid, e.g. oil, a fluid sold under the registered trademark PYROCHLOR or S.F.6, in a closed circuit is pumped into the chamber defined by the annular body 11 through an inlet port 23, and is forced upwardly through the ducts 16, issuing at the top and flowing downwardly over the stacked components, completely filling the enclosure, and out from the bottom trough through an outlet port 24 to a heat exchanger 25 for recycling via a pump 26.

Figure 3:
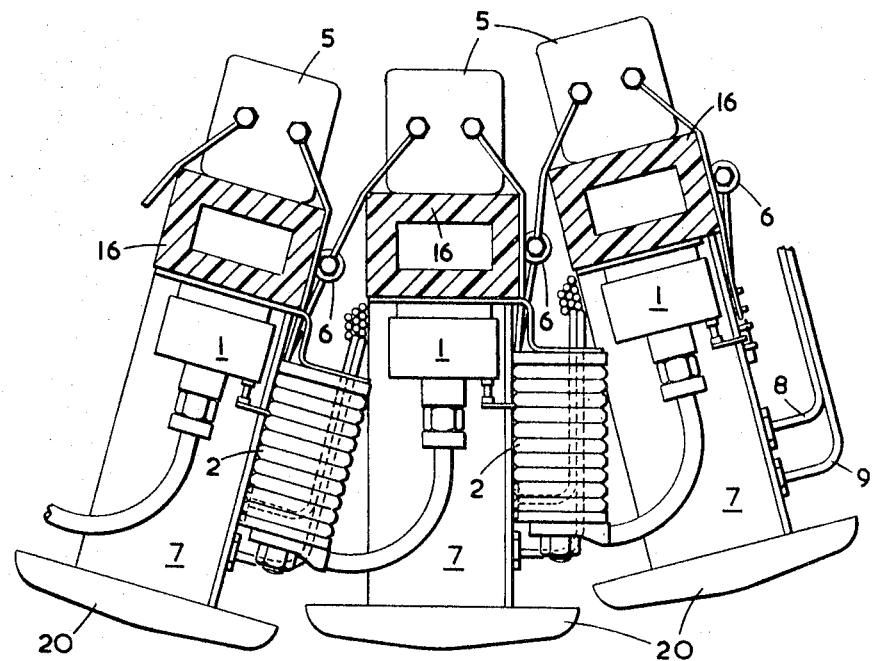
FIG. 3 illustrates a plan view of some of the thyristors and these components as they are arranged in the stack.
Figure 4:
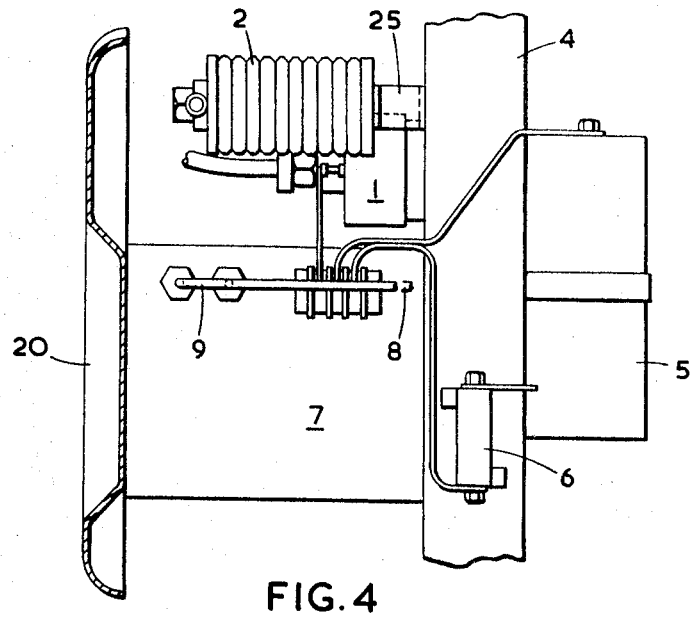
FIG. 4 is a side elevation of FIG. 3.
Figure 5:
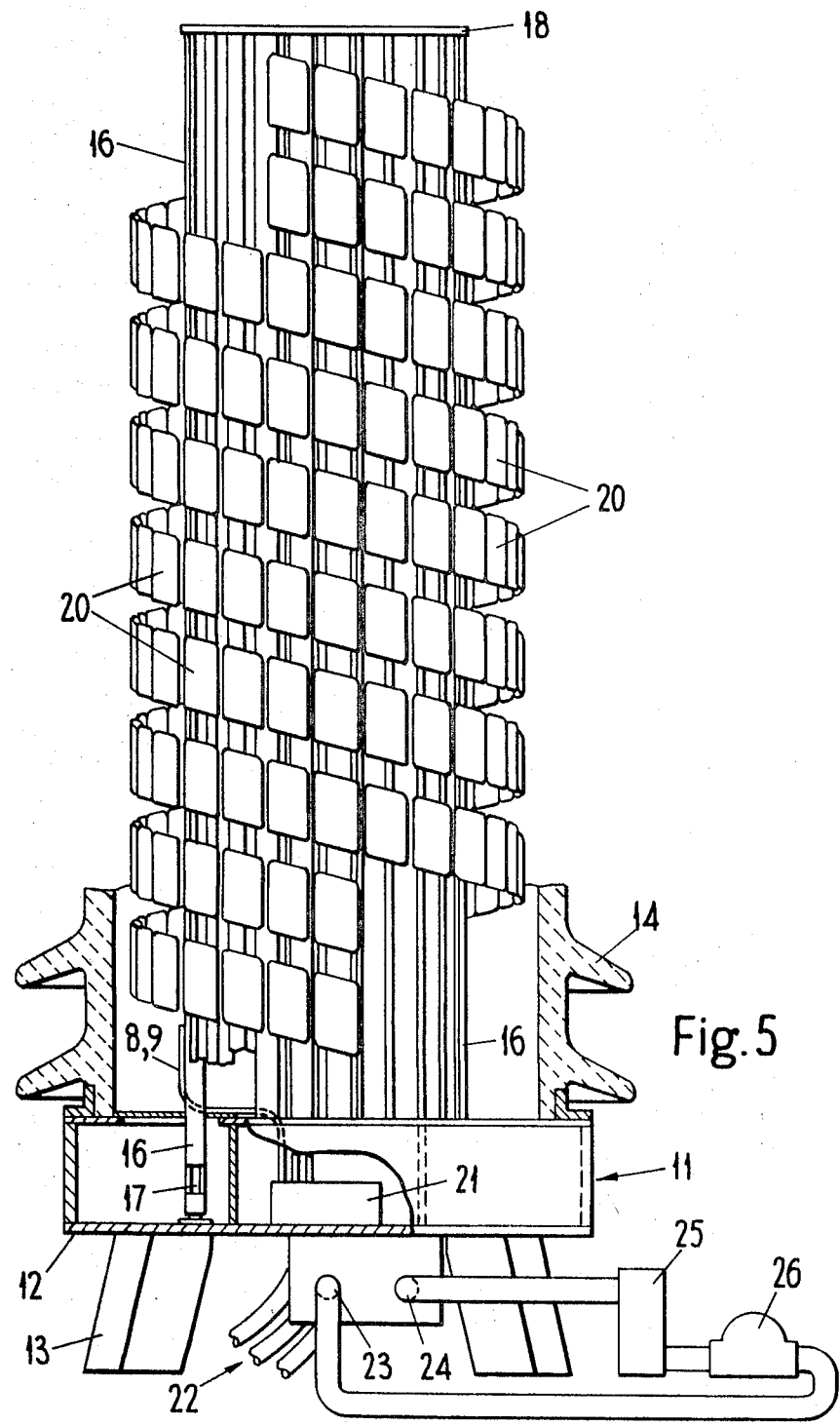
FIG. 5 illustrates the physical layout of the thyristors in two coextensive helical paths around the central column.

Referring now to FIGS. 3 and 4, the disposition of the thyristors and their associated components are shown, the thyristors 1 being directly bolted on to the ducts 16; these thyristors may in fact have a heat sink integral therewith. The series reactors 2 are secured to brackets 25 extending from the outer side of the ducts and the capacitors 5 in the voltage-sharing network are secured against the inner side of the ducts and are connected to their associated resistors 6 which are likewise secured to these ducts; this latter component may also have a heat sink integral therewith. The filamentary light guides, as mentioned, also run alongside the ducts, bundles of these filaments being taken off in pairs 8 and 9 to each gating circuit 7. These gating circuits are contained within a boxlike housing secured to the appropriate duct and in turn carry the corona shields 20 which, as mentioned above, are electrically connected to the cathode of the associated thyristor.

Although the invention has been described with reference to one particular embodiment showing the detailed disposition of the various components it is to be understood that various alterations and modifications may be made without departing from the scope of this invention. For example, the layout of the individual components may obviously be changed within the context of maintaining the overall helical disposition of the thyristors and associated circuitry; furthermore, it is envisaged that corona shields may additionally be provided on the sharing capacitors to minimize the risk of flashovers between them across the center of the stack. The use of the mixer for the fiber optics may also prove to be unnecessary under some circumstances. Furthermore, the voltage-sharing circuits, which would all have the same voltage drop for equally rated thyristors throughout the series string, may all be designed to exhibit different voltage drops corresponding to their associated thyristors if the ratings of these components differ significantly from one another. For example, higher rated thyristors may be employed at that end of the string remote from earth than those closer to earth potential to better accommodate transient voltages which tend to be greater in magnitude the further are the affected components from earth. In addition, better utilization of the available thyristors can be effected in this way principally because currently the production "spread" in the manufacture of a batch of thyristors at the highest rating possible necessarily results in perhaps 80 percent of the batch having a slightly lower rating, e.g. 10 percent—15 percent lower, than the highest rated components, and instead of the overall rating of the converter being downgraded and dictated by the lower rated components all the thyristors produced within an acceptable range can be individually utilized to their full rating. Alternatively, a greater degree of standardization can be obtained by arranging the thyristors in groups corresponding to particular rating ranges.

It is to be understood also that it is not necessary to provide a ceramic insulating envelope, and alternatively the equipment may be contained within a steel tank with the connections to the bridge being taken out through insulating bushings. Several of the tubular ducts may also be connected in series, i.e. they may not all have open ends terminating at the top of the stack and some may be coupled together so as to provide a path of say three lengths through which the coolant flows before issuing into the body of the tank.

Multistart helical paths may also be used with series-parallel thyristor strings, the helical paths which the paralleled thyristors follow being located close together. Furthermore, two bridge arms may be contained within one sealed envelope, the two networks being superposed upon one another with a connection taken out at the midpoint in addition to the ends. Three of such stacks would then form a complete three-phase bridge.

We claim:
1. Thyristor equipment comprising
   a hollow annular receptacle for a coolant fluid,
   a plurality of tubular ducts equidistantly spaced from one another around the receptacle and upstanding therefrom in a cylindrical configuration, and
   a plurality of thyristors and associated circuitry mounted along the length of each duct which is arranged to conduct fluid from the receptacle, the thyristors being so arranged relatively to one another as to define a helical path encircling all the said ducts.
2. Thyristor equipment according to claim 1, comprising
   a sealed tubular enveloping housing, and
   a trough at the base of the housing adjacent the annular receptacle, the coolant fluid being caused to issue from the top of the ducts within the housing and thence flow downwardly into said trough.
3. Thyristor equipment according to claim 2, comprising
   a heat exchanger in the flow circuit of said coolant, and
   a pump for continuously pumping the fluid around this circuit.
4. Thyristor equipment according to claim 3, wherein the thyristors are so arranged as to define a plurality of separate helical paths interspersed and coextensive with one another.
5. Thyristor equipment according to claim 4, comprising
   corona shields connected to the thyristors and disposed between these thyristors and the inner surface of the housing.
6. Thyristor equipment according to claim 5, wherein the circuitry associated with the thyristors is principally located on the outer side of the ducts, together with the thyristors.
7. Thyristor equipment according to claim 5, comprising
   bundles of fiber optics extending along the ducts, the thyristors being light-fired by signals transmitted through these bundles.
8. Thyristor equipment according to claim 7, comprising
   a mixer block from which the fiber optic bundles extend, the mixer being operative to provide a uniform distribution of light amongst these bundles from primary light guides transmitting light thereto from a source external to the equipment.
9. Thyristor equipment comprising
   a hollow annular receptacle for a coolant fluid,
   a plurality of tubular ducts equidistantly spaced from one another around the receptacle and upstanding therefrom in cylindrical configuration,
   a trough adjacent the said receptacle,
   a sealed tubular enveloping housing,
   a pump for pumping the fluid through the ducts whereby it issues through the top of the ducts and thence flows downwardly into the said trough,
   a plurality of thyristors and associated circuitry mounted along the length of each duct, the thyristors being so arranged relatively to one another as to define a helical path encircling all the ducts, and
   bundles of fiber optics extending along the ducts whereby to transmit light-firing signals to said thyristors.
10. Thyristor equipment according to claim 9, wherein the circuitry associated with the thyristors is principally located on the outer side of the ducts, together with the thyristors, said equipment further comprising
   corona shields connected to the thyristors and disposed between these thyristors and the inner surface of the housing.